United States Patent
Pan et al.

(10) Patent No.: US 12,090,404 B2
(45) Date of Patent: Sep. 17, 2024

(54) VIRTUAL OBJECT CONTROL METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Jiaqi Pan, Shenzhen (CN); Zefeng Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 216 days.

(21) Appl. No.: 17/585,331

(22) Filed: Jan. 26, 2022

(65) Prior Publication Data

US 2022/0152505 A1    May 19, 2022

Related U.S. Application Data

(63) Continuation of application No. PCT/CN2021/123270, filed on Oct. 12, 2021.

(30) Foreign Application Priority Data

Nov. 13, 2020   (CN) .......................... 202011270984.7

(51) Int. Cl.
A63F 13/56      (2014.01)
A63F 13/214     (2014.01)
A63F 13/42      (2014.01)

(52) U.S. Cl.
CPC ............ *A63F 13/56* (2014.09); *A63F 13/214* (2014.09); *A63F 13/42* (2014.09)

(58) Field of Classification Search
CPC ........ A63F 13/53; A63F 13/56; A63F 13/214; A63F 13/42
See application file for complete search history.

(56) References Cited

U.S. PATENT DOCUMENTS 9,952,755 B2 *   4/2018  Ogiso .................. G06F 3/04845
10,180,714 B1 *  1/2019  Kin ..................... G06F 3/04883
(Continued)

FOREIGN PATENT DOCUMENTS

CN    108446063 A    8/2018
CN    108509139 A    9/2018
(Continued)

OTHER PUBLICATIONS

Sam Sam, "[Apex Legends] Rope Jump Teaching", Jun. 16, 2019, 3 pgs., Retrieved from the Internet: https://www.youtube.com/watch?v=c7bmmejxF4Y.

(Continued)

*Primary Examiner* — Steve Rowland
(74) *Attorney, Agent, or Firm* — Morgan, Lewis & Bockius LLP

(57) ABSTRACT

Disclosed are a virtual object control method performed by an electronic device. The method includes: displaying a target virtual object and a virtual action button in a display interface, the virtual action button being configured to control the target virtual object to perform a first action; displaying first prompt information in the display interface when the target virtual object is within a trigger range of a target interaction event, the first prompt information being used for prompting to perform a touch operation on the virtual action button; adding an action indicator to the first prompt information when a first touch operation satisfying a predefined threshold condition associated with a second action is initiated on the virtual action button; and controlling the target virtual object to perform the second action in the target interaction event when the first touch operation performed on the virtual action button is completed.

20 Claims, 7 Drawing Sheets

(56) References Cited

U.S. PATENT DOCUMENTS

| | | | | |
|---|---|---|---|---|
| 10,318,034 | B1* | 6/2019 | Hauenstein | G06F 3/04883 |
| 10,603,589 | B2* | 3/2020 | Miyamoto | A63F 13/56 |
| 2009/0143141 | A1* | 6/2009 | Wells | G07F 17/3239 |
| | | | | 463/37 |
| 2010/0045667 | A1* | 2/2010 | Kornmann | G06T 19/003 |
| | | | | 345/158 |
| 2010/0289768 | A1* | 11/2010 | Nakao | G06F 3/04847 |
| | | | | 345/173 |
| 2014/0081438 | A1* | 3/2014 | Knutsson | A63F 13/822 |
| | | | | 700/92 |
| 2015/0157940 | A1* | 6/2015 | Hall | A63F 13/5372 |
| | | | | 463/31 |
| 2015/0182856 | A1* | 7/2015 | Mays, III | G06F 3/0488 |
| | | | | 463/31 |
| 2015/0231500 | A1* | 8/2015 | Aizono | A63F 13/422 |
| | | | | 463/31 |
| 2015/0258430 | A1* | 9/2015 | Alexeev | G06F 3/04883 |
| | | | | 463/36 |
| 2016/0199728 | A1 | 7/2016 | Yoon | |
| 2017/0007921 | A1 | 1/2017 | Baba et al. | |
| 2018/0024660 | A1* | 1/2018 | Wang | G06F 3/04817 |
| | | | | 273/110 |
| 2018/0164801 | A1* | 6/2018 | Kim | G05D 1/0033 |
| 2019/0046878 | A1* | 2/2019 | Howard | A63F 13/426 |
| 2019/0126148 | A1* | 5/2019 | Wei | A63F 13/2145 |
| 2020/0188774 | A1* | 6/2020 | Fung | A63F 13/235 |
| 2020/0298119 | A1 | 9/2020 | Han et al. | |
| 2021/0339151 | A1* | 11/2021 | Stafford | A63F 13/213 |
| 2021/0379491 | A1* | 12/2021 | Liu | A63F 13/537 |

FOREIGN PATENT DOCUMENTS

| | | |
|---|---|---|
| CN | 110013671 A | 7/2019 |
| CN | 110215691 A | 9/2019 |
| CN | 110270086 A | 9/2019 |
| CN | 111659118 A | 9/2020 |
| CN | 111773681 A | 10/2020 |
| CN | 112245918 A | 1/2021 |
| JP | 2006181286 A | 7/2006 |
| JP | 4258850 B2 | 4/2009 |
| KR | 20130040390 A | 4/2013 |
| KR | 20180005222 A | 1/2018 |
| RU | 2686011 C1 | 4/2019 |
| TW | I620589 B | 4/2018 |
| WO | WO 2015151640 A1 | 10/2015 |
| WO | WO 2020168680 A1 | 8/2020 |

OTHER PUBLICATIONS

Tencent Technology, English Office Action, EP Patent Application No. 21815878.0, Jul. 18, 2023, 7 pgs.
Tencent Technology, Japanese Office Action, JP Patent Application No. 2022- 514177, Sep. 12, 2023, 7 pgs.
Tencent Technology, Singapore Office Action, SG Patent Application No. 11202200687Y, Nov. 3, 2023, 9 pgs.
PUBG Mobile, "Gameplay Walkthrough Part 1—4$^{th}$ Place", (IOS, Android), 0:36-1:11, 19:00-21:00, Mar. 24, 2018, PUBG Mobile—Gameplay Walkthrough Part 1—4th Place iOS. Android)—YouTube.
Tencent Technology, WO, PCT/CN2021/123270, Jan. 21, 2022, 5 pgs.
Tencent Technology, IPRP, PCT/CN2021/123270, May 16, 2023, 6 pgs.
Tencent Technology, ISR, PCT/CN2021/123270, Jan. 21, 2022, 3 pgs.
BobSappAim, "[APEX] Thorough Explanation of Grapple Techniques from Basics to Applications! [PathFinder]", YouTube, Mar. 13, 2020, 2 pgs., Retrieved from the Internet: https://www.youtube.com/watch?v =CWyzliwF8zY.
Tencent Technology, Canadian Office Action, CA Patent Application No. 3,146,804, Mar. 24, 2023, 6 pgs.
Tencent Technology, Japanese Office Action, JP Patent Application No. 2022-514177, Apr. 4, 2023, 12 pgs.
[Wilderness Action] Jump and Parkour Separation Function! New Setting "By crossing the Wall Motion" Commentary!, Wilderness Action News, Jul. 10, 2019, Retrieved from the Internet: https://knivesoutnews.com/jump2/.
Extended European Search Report, EP21815878.0, Oct. 20, 2022, 11 pgs.
Tencent Technology, Australian Office Action, AU Patent Application No. 2021307015, Dec. 15, 2022, 3 pgs.
Forget Everything, "Easy Way About Apex Rope Jump", Apex Hero Bar, Baidu.com, 3 pgs., Retrieved from the Internet: https://tieba.baidu.com/p/6135169914.
Tencent Technology, Vietnamese Office Action, VN Patent Application No. 1-2022-00893, Jun. 15, 2023, 2 pgs.
Mozambique, "Easy Way About Apex Rope Jump", May 18, 2019,4 pgs., Retrieved from the Internet: https://tieba.baidu.com/p/6135169914.
Tencent Technology, Korean Office Action, KR Patent Application No. 10-2022-7002073, Feb. 2, 2024, 20 pgs.
Tencent Technology, European Office Action, EP Patent Application No. 21815878.0, Jan. 10, 2024, 8 pgs.
Cau7ion, "The Super Zipline Jump (Tutorial)—Controller & MnK", YoutTube, 3 pgs., Retrieved from the Internet: https://www.youtube.com/watch?v=bQ-VSKZg pg.
Tencent Technology, Russian Office Action, RU Patent Application No. 2022101194, Dec. 26, 2023, 12 pgs.
Tencent Technology, Indian Office Action, IN Patent Application No. 202247007966, Apr. 15, 2024, 6 pgs.
Youtube.com, "Apex Legends Tutorial", All Controls, All Pings, Training Mode!!! , Retrieved from the Internet: https://www.youtube.com/watch?v=HUhf_HhoUE4, Feb. 2019, 3 pgs.
Tencent Technology, Canadian Office Action, CA Patent Application No. 3,146,804, Jan. 18, 2024, 4 pgs.

* cited by examiner

US 12,090,404 B2

VIRTUAL OBJECT CONTROL METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2021/123270, entitled "VIRTUAL OBJECT CONTROL METHOD AND APPARATUS, STORAGE MEDIUM, AND ELECTRONIC DEVICE" filed on Oct. 12, 2021, which claims priority to Chinese Patent Application No. 202011270984.7 filed on Nov. 13, 2020, all of which are incorporated by reference in their entirety.

FIELD OF THE TECHNOLOGY

This application relates to the field of computers, and specifically, to a virtual object control method and apparatus, a storage medium, an electronic device, and a computer program product.

BACKGROUND OF THE DISCLOSURE

With development of technologies and improvement of performance of electronic devices, channels for perceiving an environment and obtaining information are expanded, especially the virtual display technology, which can realize diversified interaction based on virtual objects according to actual requirements.

In the current related art, a button is usually displayed for interaction when an interaction condition is satisfied, resulting in an increased number of button controls in an interface, and further leading to a defect of obstructing a field of view. Taking a game scene as an example, when a variety of game operations are triggerable, a plurality of buttons for triggering are arranged in a region of trigger buttons, making a user confused. Further, when a virtual object is controlled to perform a predetermined complex action, a plurality of trigger buttons needs to be used, resulting in low control efficiency.

For the foregoing problems, no effective solution has been provided by now.

SUMMARY

An embodiment of this application provides a virtual object control method, including:

displaying a target virtual object and a virtual action button in a display interface, the virtual action button being configured to control the target virtual object to perform a first action;

displaying first prompt information in a surrounding region of the virtual action button of in the display interface when the target virtual object is within a trigger range of a target interaction event, the first prompt information being used for prompting to perform a touch operation on the virtual action button;

adding an action indicator to the first prompt information when a first touch operation satisfying a predefined threshold condition associated with a second action is initiated on the virtual action button, the action indicator indicating that the second action different from the first is to be performed; and controlling the target virtual object to perform the second action in the target interaction event when the first touch operation satisfying the predefined threshold condition associated with the second action is completed on the virtual action button.

An embodiment of this application provides a non-transitory computer-readable storage medium, storing computer instructions, the computer instructions, when executed by a processor, implementing the virtual object control method provided in the embodiments of this application.

An embodiment of this application provides an electronic device, including a memory and a processor, the memory storing computer instructions, and the processor being configured to implement the foregoing virtual object control method through the computer instructions.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

Figure 1:
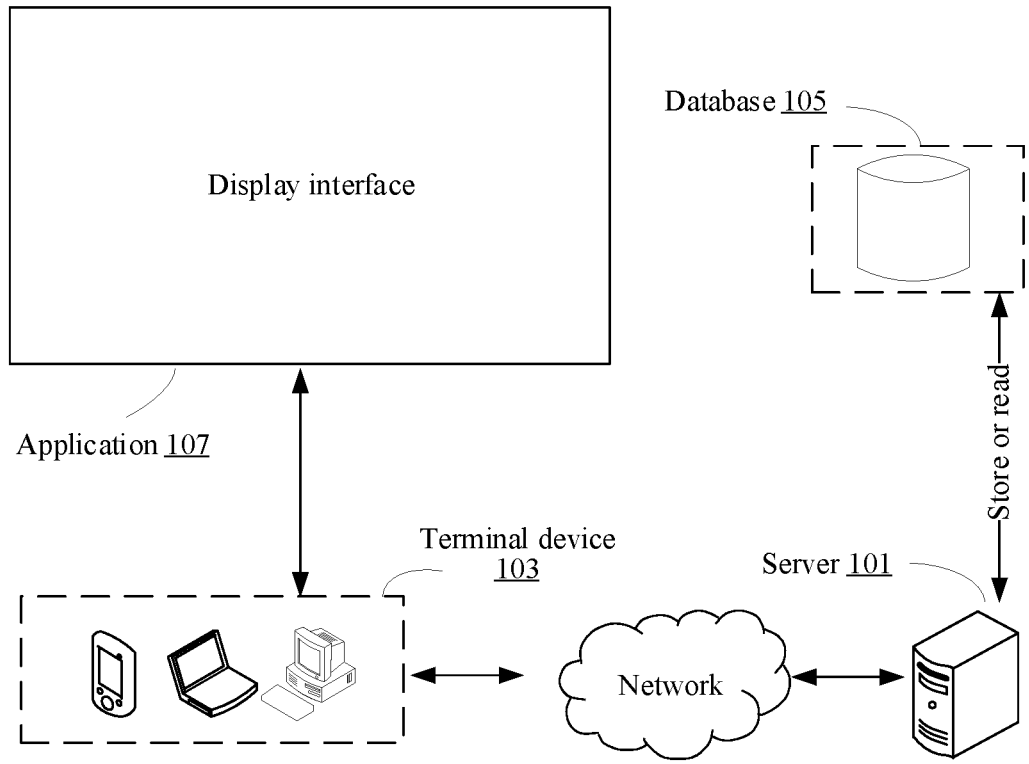
FIG. 1 is a schematic diagram of an application environment of a virtual object control method according to an embodiment of this application.

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In the specification, claims, and accompanying drawings of this application, the terms "first", "second", and so on are intended to distinguish between similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In the following description, the term "plurality of" means at least two.

First, some terms appearing in a process of describing the embodiments of this application are suitable for the following explanations:

1) Virtual scene: A virtual scene is a scene that is outputted by using an electronic device and that is different from the real world. Visual perception of the virtual scene can be formed with the aid of naked eyes or devices, for example, by using two-dimensional images outputted by using a display screen or three-dimensional images outputted by using a three-dimensional display technology such as a three-dimensional projection, virtual reality, or augmented reality technology. In addition, a variety of perception simulating the real world such as auditory perception, tactile perception, olfactory perception, and motion perception can be further formed by using a variety of possible hardware. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this application.

2) Virtual object: Virtual objects are images of various people and things that can interact in a virtual scene, or movable objects in the virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene. For example, the virtual object may be a virtual character in a virtual scene and controlled by a user or artificial intelligence (AI).

3) Virtual prop: A virtual prop is also referred to as an interactive prop, and is configured for interaction by a virtual object in a virtual scene. For example, the virtual prop may include a virtual zipline. The virtual zipline is configured to connect two locations, and a player may quickly transfer from one location to another by riding the zipline.

This application is described below with reference to the embodiments.

An embodiment of this application provides a virtual object control method, in some embodiments, the virtual object control method may be applied to a hardware environment formed by a server 101 and a terminal device 103 shown in FIG. 1. As shown in FIG. 1, the server 101 is connected to the terminal device 103 through a network, and may be configured to provide services for the terminal device 103 or an application 107 installed in the terminal device 103. The application may be a video application, an instant messaging application, a browser application, an education application, a game application, or the like, and may further include, but is not limited to, another application that can perform virtual object control. A database 105 may be set in the server 101 or independent of the server 101, and the database 105 is configured to provide the server 101 with data storage services, such as game data storage services. The network may include, but is not limited to, a wired network and a wireless network. The wired network includes, but is not limited to, a local area network, a metropolitan area network, and a wide area network. The wireless network includes, but is not limited to, Bluetooth, Wi-Fi, and other networks implementing wireless communication. The terminal device 103 may be a terminal device configured with a virtual object control application (that is, the application 107), and may include, but is not limited to, at least one of the following: a mobile phone (for example, an Android phone or an iOS phone), a notebook computer, a tablet computer, a palmtop computer, a mobile Internet device (MID), a PAD, a desktop computer, a smart TV, and the like. The foregoing server 101 may be a single server or a server cluster that includes a plurality of servers, or may be a cloud server, which may include, but is not limited to, a router or a gateway. Through an entry of the application 107 for virtual object control configured in the terminal device 103, the application 107 may be started, and a virtual scene (including a target virtual object and a virtual action button) may be outputted in a display interface of the application 107. Taking the application 107 being a game application as an example, the display interface may include a game screen (or referred to as a game interface) and an interaction interface. Certainly, this is only an example, and this is no limited in this embodiment.

As shown in FIG. 1, the foregoing virtual object control method may be implemented on the terminal device 103 through the following steps:

S1: Start the application 107 on the terminal device 103, and display a target virtual object and a virtual action button in the display interface of the application 107, the virtual action button being configured to control the target virtual object to perform a first action;

S2: Display first prompt information in the display interface of the application 107 when the target virtual object in the application 107 is within a trigger range of a target interaction event, the first prompt information being used for prompting to perform a touch operation on the virtual action button; and S3: Control the target virtual object to perform a second action in the target interaction event in the application 107 when a first touch operation performed on the virtual action button is detected in the application 107.

Taking the application 107 being a game application as an example, the display interface may include a game screen and an interaction interface, and the virtual action button and the first prompt information may be displayed in the interaction interface.

In some embodiments, the foregoing virtual object control method may be alternatively implemented by, including but not limited to, an application program configured on the server 101, or the terminal device 103 or the server 101 may implement the virtual object control method in combination. For example, the server 101 may send related display data of the virtual scene to the terminal device 103, so that the terminal device 103 displays the virtual scene according to the received display data. The foregoing description is merely an example, and is not specifically limited in this embodiment.

Figure 2:
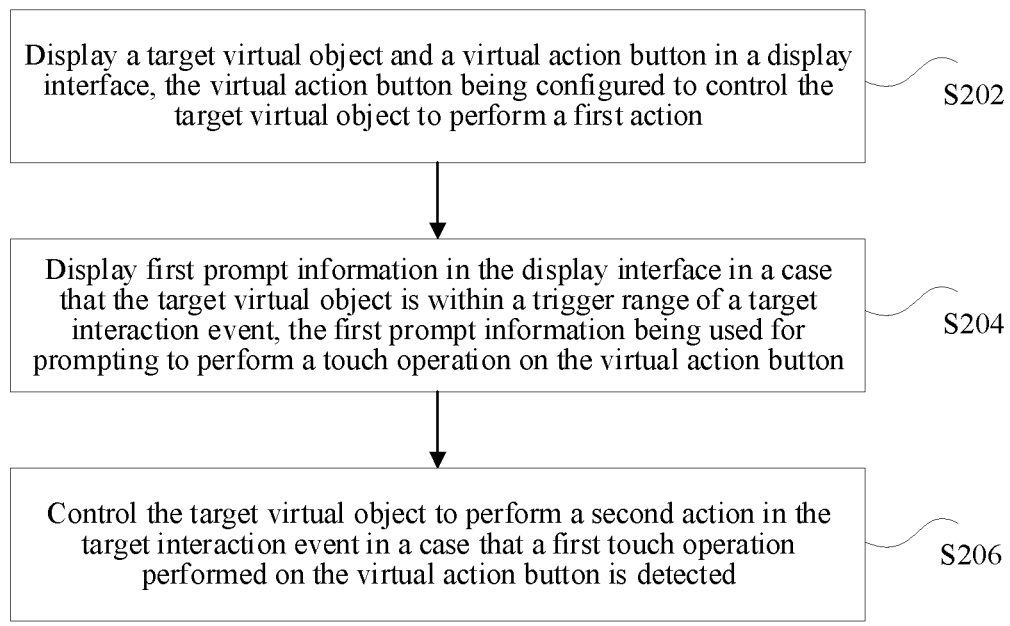
FIG. 2 is a schematic flowchart of a virtual object control method according to an embodiment of this application.

In some embodiments, as shown in FIG. 2, the virtual object control method includes the following steps:

S202: Display a target virtual object and a virtual action button in a display interface, the virtual action button being configured to control the target virtual object to perform a first action;

S204: Display first prompt information in a surrounding region of the virtual action button of in the display interface when the target virtual object is within a trigger range of a target interaction event, the first prompt information being used for prompting to perform a touch operation on the virtual action button; in some embodiment, add an action indicator to the first prompt information when a first touch operation satisfying a predefined threshold condition associated with a second action is initiated on the virtual action button, the action indicator indicating that the second action different from the first is to be performed; and S206: Control the target virtual object to perform the second action in the target interaction event when the first touch operation satisfying the predefined threshold condition associated with the second action is completed on the virtual action button.

In some embodiments, the virtual object control application for implementing the virtual object control method may include, but is not limited to, game software, an app, an applet, and the like, and may further include, but is not limited to, a control function configured in any software, app, applet, and the like. The target virtual object may include, but is not limited to, a virtual object controlled when the virtual object control application is logged in to after a background or server corresponding to the virtual object control application is registered.

Taking the virtual object control application being a game application as an example, the display interface may include a game screen and an interaction interface. The game screen and the interaction interface may include, but are not limited to, being configured to be displayed in the same display region, displayed in an overlapping manner, or displayed in different display regions (that is, the interaction interface is displayed in a region other than the game screen in the display interface). The game screen may be used for displaying the target virtual object, and the interaction interface may be used for displaying the virtual action button and the first prompt information. Certainly, the display logic is not limited thereto.

Figure 3:
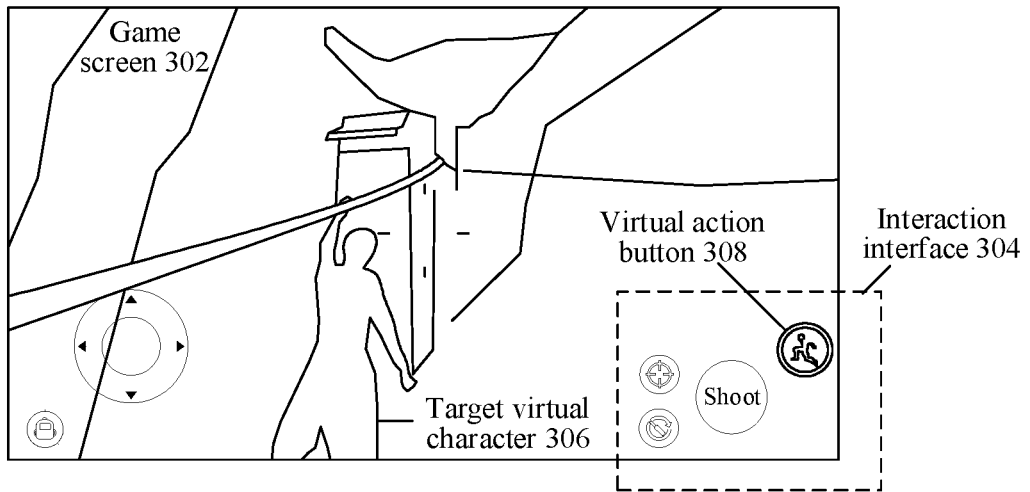
FIG. 3 is a schematic diagram of a display interface according to an embodiment of this application.

In some embodiments, FIG. 3 is a schematic diagram of a display interface according to an embodiment of this application. As shown in FIG. 3, it may include, but is not limited to, displaying a game screen 302 and an interaction interface 304 in a game application, where the game screen 302 includes a target virtual character 306 (the target virtual character 306 is an example of a target virtual object), and a virtual action button 308 is displayed in the interaction interface 304. The foregoing description is merely an example, and is not specifically limited in this embodiment.

In some embodiments, the virtual action button may include, but is not limited to, being configured to control the target virtual object to perform a preset first action when a touch operation performed on the virtual action button is detected.

For example, taking the virtual action button 308 shown in FIG. 3 as an example, the virtual action button 308 is configured as a "jump" button, that is, when a touch operation performed on the virtual action button 308 is detected, the target virtual character 306 is controlled to perform a "jumping" operation.

The first action may be flexibly configured according to a virtual object control application. For example, the first action may include, but is not limited to, being configured as a control manner of the virtual object such as "jumping", "squatting", "crouching down", and "bending down", may further include, but is not limited to, a control manner of the virtual object such as pushing, pulling, lifting, and pressing down, and may further include, but is not limited to, being configured to match a preset interaction event. For example, when the interaction event is that the target virtual object is in a region in which a predetermined operation is allowed to be performed, the target virtual object is controlled to perform the predetermined operation; when the interaction event is that the target virtual object is in a region in which a virtual prop is allowed to be turned on, the target virtual object is controlled to perform an operation of turning on the virtual prop; and when the interaction event is that the target virtual object is in a region in which a virtual prop is allowed to be used, the target virtual object is controlled to perform an operation of using the virtual prop. The foregoing description is merely an example, and is not specifically limited in this embodiment.

In some embodiments, the first action is an action initially bound to the virtual action button, and the second action is an action performed when the target virtual object is in a target interaction event. The foregoing first prompt information is used for prompting to perform a touch operation on the virtual action button. The touch operation may include, but is not limited to, clicking, long pressing, dragging, releasing, double clicking, and the like, and may further include, but is not limited to, configuring corresponding effects of different touch operations according to a press strength, where the long press means that a press duration is greater than a duration threshold.

Figure 4:
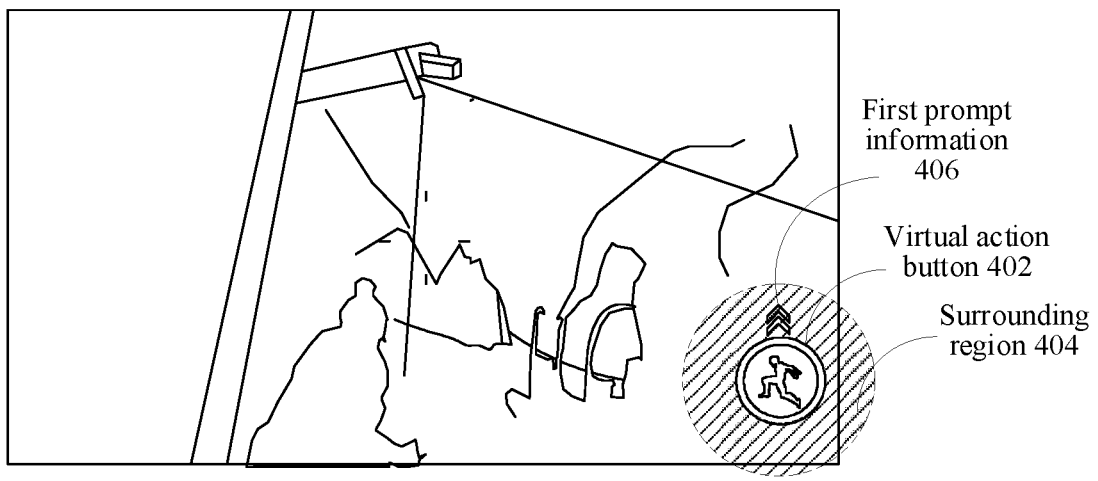
FIG. 4 is a schematic diagram of another display interface according to an embodiment of this application.

For example, when the touch operation is dragging, the first prompt information may, but is not limited to, be configured to add a corresponding drag direction mark around the virtual action button. FIG. 4 is a schematic diagram of a display interface according to an embodiment of this application. As shown in FIG. 4, when a target virtual character is within a trigger range of a target interaction event, first prompt information 406 is displayed in a surrounding region 404 of a virtual action button 402. A drag direction corresponding to a drag operation may be indicated by, including but not limited to, an arrow. Voice information instructing to perform the drag operation on the virtual action button may be played in the form of, including but not limited to, voice.

Figure 5:
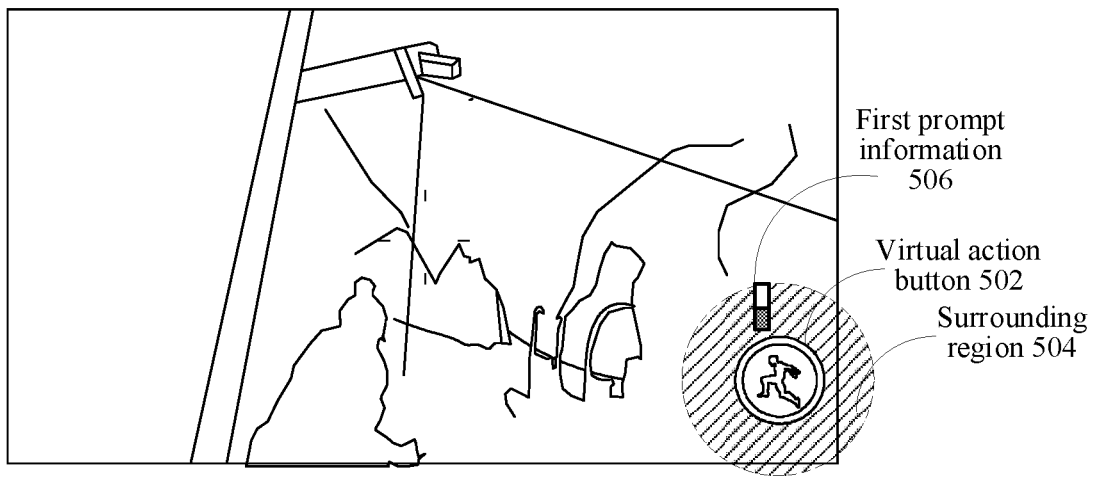
FIG. 5 is a schematic diagram of still another display interface according to an embodiment of this application.

In another example, when the touch operation is a press operation, the first prompt information may, but is not limited to, be configured to add a corresponding press strength mark around the virtual action button. FIG. 5 is a schematic diagram of a display interface according to an embodiment of this application. As shown in FIG. 5, when a target virtual character is within a trigger range of a target interaction event, first prompt information 506 is displayed in a surrounding region 504 of a virtual action button 502. A press strength corresponding to a press operation may be indicated by, including but not limited to, a strength histogram. A shaded part in the first prompt information 506 is a current press strength. A corresponding strength threshold identifier may be configured in the first prompt information 506 to inform a user to perform a corresponding second action after a press strength that reaches a strength threshold is detected. It may include, but not limited to, displaying a text identifier in a game screen to instruct to perform the press operation on the virtual action button. Different press strengths correspond to text identifiers with different effects. The foregoing description is merely an example, and the specific implementation may include, but is not limited to, one or a combination of the above. This is not specifically limited in this embodiment.

In some embodiments, the target interaction event may include, but is not limited to, an interaction event for an interactive prop, an interaction event for an interactive region, and an interaction event for an interactive virtual object. For example, in a game application, the target interaction event may include, but is not limited to, zipline, rock climbing, swimming, riding, talking, shopping, and the like.

In this embodiment, the virtual action button is configured to perform the second action different from the pre-configured first action when within the trigger range of the target interaction event, so that the same virtual action button can perform different virtual actions in different regions, thereby improving the efficiency of controlling a virtual object, optimizing the user experience, reducing the undesirable effects such as obscured vision caused by too many virtual buttons, and further resolving the technical problem of the low efficiency of controlling a virtual object in the related art.

In some embodiments, the controlling the target virtual object to perform a second action in the target interaction event when a first touch operation performed on the virtual action button is detected includes: controlling the target virtual object to perform the second action in the target interaction event when the first touch operation performed on the virtual action button is detected and the first touch operation ends in a target region. For example, the first touch operation may include, but is not limited to, a slide operation.

Through this embodiment, the target virtual object is controlled to perform the second action in the target interaction event when the first touch operation performed on the virtual action button is detected and the first touch operation ends in a target region. It can be flexibly and simply implemented that the first touch operation is performed for the same virtual action button, and other functions different from an original function of the virtual action button can be realized according to a direction of the first touch operation. Further, when the target virtual object is in the trigger range of the target interaction event, a quantity of virtual action buttons displayed can be reduced, and a plurality of virtual actions can be completed, which resolves the technical problems of the complex manner of controlling a virtual object and relatively low control efficiency in the related art. The technical effects of optimizing the user experience and improving the efficiency of controlling a target virtual object to complete a plurality of operations by the user are realized.

In some embodiments, the foregoing target region may include, but is not limited to, being preset by a system or server, or may be flexibly configured by the user on the terminal device according to actual requirements. It may include, but is not limited to, configuring the target region to be bound to the virtual action button, so that when a second touch operation performed on the virtual action button is detected, the target region is displayed. The first touch operation and the second touch operation are the same or different. For example, the first touch operation is a slide operation, and the second touch operation is any one of the slide operation or a long-press operation. In a case that the display interface includes a game screen and an interaction interface, the target region may be displayed in the interaction interface.

Figure 6:
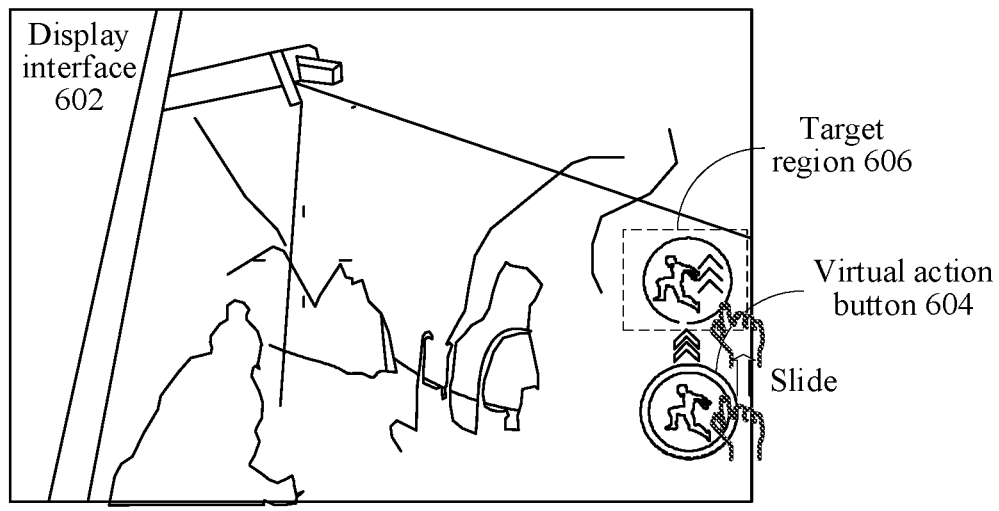
FIG. 6 is a schematic diagram of still another display interface according to an embodiment of this application.

For example, FIG. 6 is a schematic diagram of a display interface according to an embodiment of this application. As shown in FIG. 6, a virtual action button 604 is displayed in a display interface 602. When a slide operation performed on the virtual action button 604 is detected, a target region 606 is displayed by pulling up; and when it is detected that the slide operation ends in the target region 606, a target virtual character is controlled to perform a second action in a target interaction event. The slide operation herein is both a first touch operation and a second touch operation.

In some embodiments, it may include, but is not limited to, separately setting the second action corresponding to the target interaction event, and may further include, but is not limited to, setting the second action corresponding to a display identifier of the target region and corresponding to the target interaction event.

In some embodiments, the virtual object control method further includes:

S1: Display the target region in the display interface when a slide operation performed on the virtual action button is detected; or S2: Display the target region in the display interface when a long-press operation performed on the virtual action button is detected.

Figure 7:
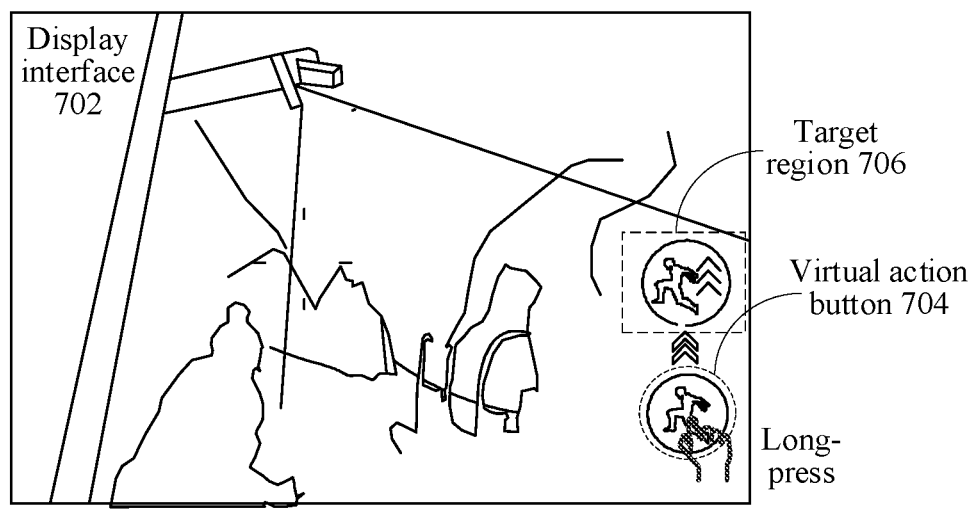
FIG. 7 is a schematic diagram of still another display interface according to an embodiment of this application.

In some embodiments, it may include, but is not limited to, configuring the virtual action button to display the target region through the slide operation or the long-press operation, where the slide operation may be shown in FIG. 6, and the long-press operation may be shown in FIG. 7. FIG. 7 is a schematic diagram of a display interface according to an embodiment of this application. A target region 706 is displayed in a display interface 702 when a long-press operation performed on a virtual action button 704 is detected. The foregoing description is merely an example, and is not specifically limited in this embodiment.

Through this embodiment, when the second touch operation (such as the slide operation or the long-press operation) performed on the virtual action button is detected, the target region is displayed, and different operations can be performed based on the virtual action button, thereby reducing a quantity of virtual action buttons displayed, and resolving the technical problems of the complex manner of controlling a virtual character and relatively low control efficiency in the related art. The technical effects of optimizing the user experience and improving the efficiency of controlling a virtual object to complete a plurality of operations by the user are realized.

In some embodiments, the virtual object control method further includes: determining, when it is detected that the virtual action button is pressed and an offset distance of the press point in a target direction is greater than a distance threshold, that a slide operation performed on the virtual action button is detected, and using the slide operation as the first touch operation. For example, when it is detected that the virtual action button is pressed by a finger of the user and an offset distance of the finger in a target direction is greater than a preset distance threshold, that a slide operation performed on the virtual action button is detected, and using the slide operation as the first touch operation. The target direction may be a direction indicated by the first prompt information, or any direction. The distance threshold may be preset by the system or the server, or may be flexibly configured according to a size of the display interface currently displayed by the terminal device (for example, at least one of a size of the game screen or a size of the interaction interface).

In some embodiments, it may include, but is not limited to, setting a press detection contact in a display region corresponding to the virtual action button, to detect whether the virtual action button is pressed (for example, whether the virtual action button is pressed by the finger of the user). For example, a press strength in the display region corresponding to the virtual action button may be acquired, and when the press strength exceeds a preset strength threshold and a holding duration exceeds a preset holding duration threshold, it is determined that the virtual action button is pressed.

In some embodiments, a displacement distance of the press point in the display interface may be obtained as the offset distance.

Figure 8:
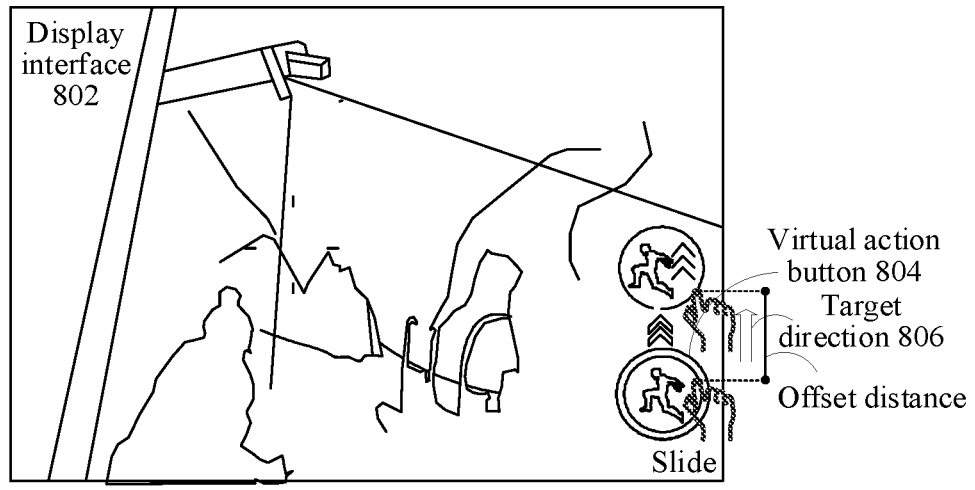
FIG. 8 is a schematic diagram of still another display interface according to an embodiment of this application.

For example, FIG. 8 is a schematic diagram of a display interface according to an embodiment of this application. As shown in FIG. 8, the process includes the following steps:

S1: Detect whether a virtual action button 804 of a display interface 802 is pressed (finger pressing is taken as an example in FIG. 8);

S2: Obtain an offset distance of the press point in a target direction 806 when it is detected that the virtual action button 804 is pressed;

S3: Determine that a slide operation performed on the virtual action button 804 is detected when the offset distance is greater than a predetermined threshold and the press point does not disappear (as shown in FIG. 8, when the finger keeps pressing).

Through this embodiment, when it is detected that the virtual action button is pressed and an offset distance of the press point in a target direction is greater than a distance threshold, it is determined that a slide operation performed on the virtual action button is detected, and the slide operation is used as the first touch operation. Further, the virtual action button can be reused, and a quantity of virtual action buttons displayed can be reduced, which resolves the technical problems of the complex manner of controlling a virtual object and relatively low control efficiency in the related art. The technical effects of optimizing the user experience and improving the efficiency of controlling a virtual object to complete a plurality of operations through one virtual action button by the user are realized.

In some embodiments, the first touch operation is a slide operation; and the virtual object control method further includes: determining that the slide operation ends in the target region when it is detected that the virtual action button is pressed and the press point slides to the target region and then disappears; or determining that the slide operation ends in the target region when it is detected that the virtual action button is dragged to overlap the target region and then the dragging ends. For example, it is determined that the slide operation ends in the target region when it is detected that the virtual action button is pressed by a finger and the finger is slid to the target region and then released; or it is determined that the slide operation ends in the target region when it is detected that the virtual action button is dragged to overlap the target region and is then released.

In some embodiments, a plurality of press detection contacts may be set at the bottom of the screen. When a press operation is detected at all the plurality of press detection contacts between the virtual action button and the target region, it is determined the press point is detected to slide to the target region, for example, the finger is slid to the target region. When no press operation is detected at the detection contacts in the target region, it is determined that the slide operation ends in the target region, for example, the finger is released in the target region.

In some embodiments, if it is detected that the virtual action button is dragged and moved, and no press operation is detected at the press detection contacts in the target region when the virtual action button is moved to the target region, it is determined that the virtual action button is detected to be dragged to overlap the target region and then the dragging ends (ending the dragging is, for example, releasing the finger).

Figure 9A:
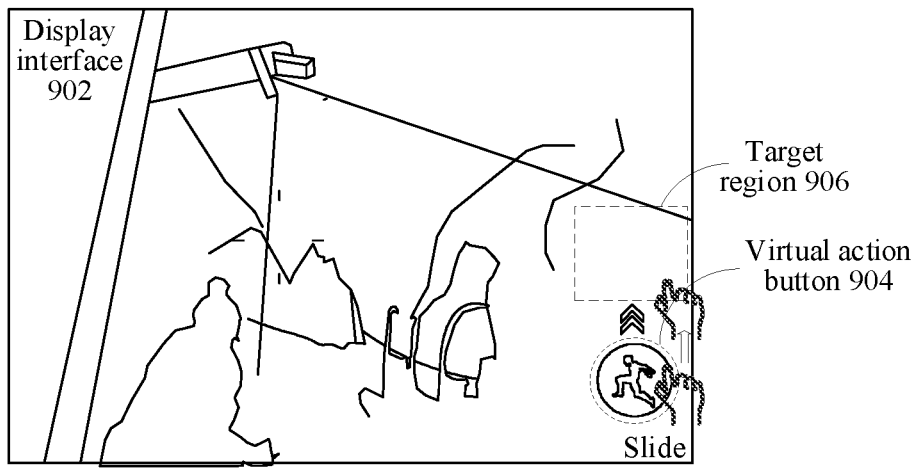
FIG. 9A is a schematic diagram of still another display interface according to an embodiment of this application.
Figure 9B:
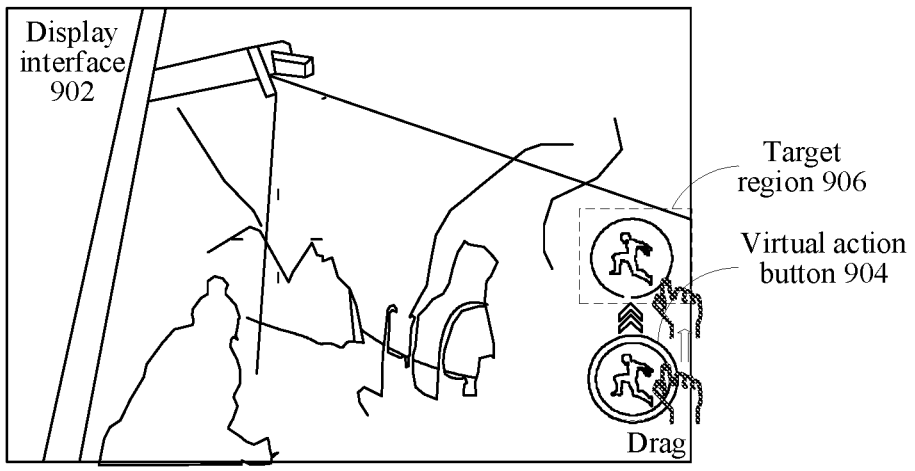
FIG. 9B is a schematic diagram of still another display interface according to an embodiment of this application.

FIG. 9A and FIG. 9B are both schematic diagrams of a display interface according to an embodiment of this application. As shown in FIG. 9A, FIG. 9A shows that a virtual action button 904 in a display interface 902 is pressed by a finger, and the finger is slid to a target region 906 and then released. FIG. 9B shows that the virtual action button 904 in the display interface 902 is dragged to overlap the target region 906 and then released.

In some embodiments, the virtual object control method further includes: displaying second prompt information in the display interface when the first touch operation performed on the virtual action button is detected and an execution object of the first touch operation is updated from the virtual action button to the target region, the second prompt information being used for prompting to end the first touch operation in the target region.

In some embodiments, the displaying second prompt information in the display interface includes: performing at least one of the following processing in the display interface: updating a display state of the target region; displaying at least one of a text identifier or an animation effect; and updating identification information of the virtual action button. For example, when the first touch operation performed on the virtual action button is detected and an execution object of the first touch operation is updated from the virtual action button to the target region, the user may be prompted in a manner of, including but not limited to, highlighting the target region, or a manner of a text identifier, voice broadcast, an animation effect of a game screen, and replacement of identification information of the virtual action button. The specific implementation process may include, but is not limited to, one or a combination of the above. The foregoing description is merely an example, and is not specifically limited in this embodiment.

Through this embodiment, it is determined that the slide operation ends in the target region when it is detected that the virtual action button is pressed and the press point slides to the target region and then disappears; or it is determined that the slide operation ends in the target region when it is detected that the virtual action button is dragged to overlap the target region and then the dragging ends. In this way, it can be determined in different manners that the slide operation ends in the target region, so that the corresponding detection manner can be configured according to modes of different applications (for example, game modes of different game applications), thereby reducing a quantity of virtual action buttons displayed, and resolving the technical problems of the complex manner of controlling a virtual object and relatively low control efficiency in the related art. The technical effects of optimizing the user experience and improving the efficiency of controlling a virtual object to complete a plurality of operations by the user are realized.

In some embodiments, the first prompt information includes direction prompt information, the direction prompt information being used for prompting a target direction of the touch operation performed on the virtual action button.

In some embodiments, the direction prompt information may include, but is not limited to, identification information such as an arrow and text. The arrow may indicate that the target virtual object is within a trigger range corresponding to a target interaction event in the form of highlighting, flashing, and the like.

Through this embodiment, the display of the direction prompt information in the display interface helps the user to intuitively acquire the direction of the touch operation, and then perform the touch operation according to the acquired direction, to realize the technical solution of controlling the target virtual object to perform different actions based on the same virtual action button, which resolves the technical problems of the complex manner of controlling a virtual object and relatively low control efficiency in the related art. The technical effects of optimizing the user experience and improving the efficiency of controlling a virtual object to complete a plurality of operations by the user are realized.

In some embodiments, the target interaction event corresponds to an interactive prop, and the second action is an interactive action on the interactive prop; or the target interaction event corresponds to an interactive region, and the second action is an interactive action on the interactive region; or the target interaction event corresponds to an interactive virtual object, and the second action is an interactive action on the interactive virtual object.

In some embodiments, the interactive prop corresponding to the target interaction event is a virtual zipline (that is, the target interaction event is a zipline riding event), and the second action is a zipline riding action on the virtual zipline, the zipline riding action being used for enabling the target virtual object to jump and hold onto the virtual zipline, and slide along the virtual zipline.

In some embodiments, the zipline riding event may include, but is not limited to, a target interaction event triggered by the target virtual object being located in a corresponding region in which the target virtual object can be triggered to use a zipline function or a riding function.

Figure 10:
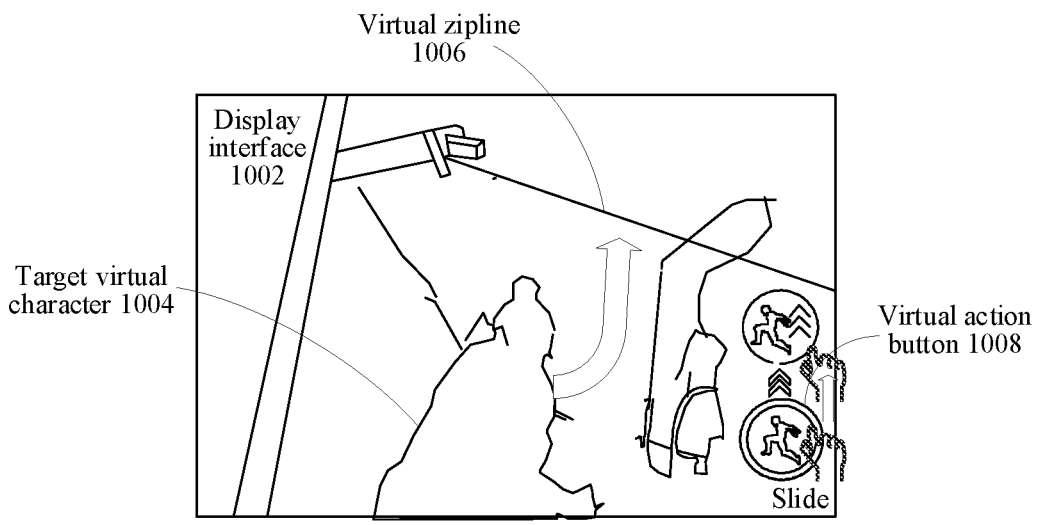
FIG. 10 is a schematic diagram of still another display interface according to an embodiment of this application.

FIG. 10 is a schematic diagram of a display interface according to an embodiment of this application. As shown in FIG. 10, for example, a target virtual character 1004 and a virtual zipline 1006 are displayed in a display interface 1002. When it is detected that a slide operation performed on a virtual action button 1008 is moved to a target region, the target virtual character 1004 is controlled to jump and hold onto the virtual zipline 1006 in a zipline riding event, and slide along the virtual zipline 1006. The foregoing description is merely an example, and is not specifically limited in this embodiment.

Through this embodiment, when the target interaction event is a zipline riding event, the target virtual object is controlled to perform a zipline riding action in the zipline riding event, so that the target virtual object jumps on and holds on the virtual zipline, and slides along the virtual zipline, thereby increasing the gameplay of the application and optimizing the user experience.

In some embodiments, the interactive region corresponding to the target interaction event is a climbing region (that is, the target interaction event is a climbing event), and the second action is a climbing action on the climbing region.

In some embodiments, the climbing event may include, but is not limited to, a target interaction event triggered by the virtual object being located in a corresponding region in which the target virtual object can be triggered to use a climbing function.

Figure 11:
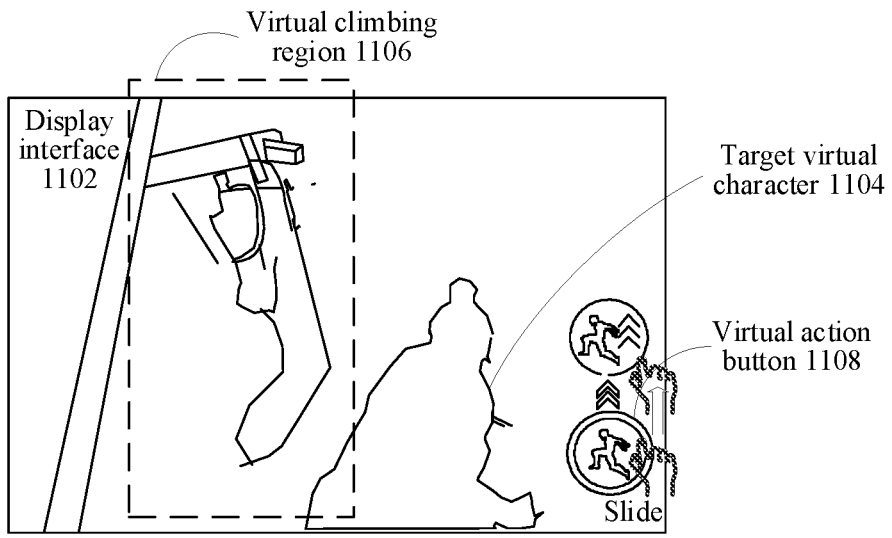
FIG. 11 is a schematic diagram of still another display interface according to an embodiment of this application.

FIG. 11 is a schematic diagram of a display interface according to an embodiment of this application. As shown in FIG. 11, for example, a target virtual character 1104 and a virtual climbing region 1106 (that is, a climbing region) are displayed in a display interface 1102. When it is detected that a slide operation performed on a virtual action button 1108 is moved to a target region, the target virtual character 1104 is controlled to perform a climbing action in the virtual climbing region 1106. The foregoing description is merely an example, and is not specifically limited in this embodiment.

Through this embodiment, when the target interaction event is a climbing event, the target virtual object is controlled to perform a climbing action in the climbing event, thereby increasing the gameplay of the application and optimizing the user experience.

In some embodiments, the virtual object control method further includes: displaying, when the target virtual object is simultaneously within trigger ranges of a plurality of target interaction events and a second touch operation performed on the virtual action button is detected, target regions respectively corresponding to the plurality of target interaction events in the display interface, the target regions being used for triggering the target virtual object to perform the second action in the corresponding target interaction events, and the first touch operation and the second touch operation being the same or different. For example, the target interaction event includes a first interaction event and a second interaction event. When the target virtual object is within a trigger range of the first interaction event and a trigger range of the second interaction event simultaneously, and a second touch operation performed on the virtual action button is detected, a first region and a second region are displayed in the display interface. The first region is a target region corresponding to the first interaction event, and the first region is used for triggering the target virtual object to perform a second action A in the first interaction event. The second region is a target region corresponding to the second interaction event, and the second region is used for triggering the target virtual object to perform a second action B in the second interaction event.

In some embodiments, the second action may include, but is not limited to, any interactive action such as using a zipline, rock climbing, swimming, riding, talking, and shopping.

In some embodiments, it may include, but is not limited to, setting the second action A and the second action B as different virtual actions, and may further include, but is not limited to, setting the second action A and the second action B as the same virtual action, but respectively corresponding to different interactive virtual objects.

In some embodiments, the first region and the second region may be flexibly set by the system or the server. A matching relationship between the first region and the second action A and a matching relationship between the second region and the second action B may include, but are not limited to, being flexibly set by the system or the server.

Through this embodiment, when the target virtual object is simultaneously within trigger ranges of a plurality of target interaction events and a second touch operation performed on the virtual action button is detected, target regions respectively corresponding to the plurality of target interaction events are displayed in the display interface, the target regions being used for triggering the target virtual object to perform the second action in the corresponding target interaction events. In this way, the user can make a selection according to actual requirements, and avoid displaying virtual action buttons respectively corresponding to different target interaction events in the display interface. This embodiment of this application can realize the technical solution of controlling the target virtual object to perform different actions based on the same virtual action button, and resolves the technical problems of the complex manner of controlling a virtual object and relatively low control efficiency in the related art. The technical effects of optimizing the user experience and improving the efficiency of controlling a virtual object to complete a plurality of interactive operations by the user are realized.

In some embodiments, the controlling the target virtual object to perform a second action in the target interaction event when a first touch operation performed on the virtual action button is detected includes: controlling, when the first touch operation performed on the virtual action button is detected and the first touch operation ends in any target region, the target virtual object to perform the second action in a target interaction event corresponding to the any target region. For example, the target virtual object is controlled to perform the second action A in the first interaction event when the first touch operation performed on the virtual action button is detected and the first touch operation ends in the first region; and the target virtual object is controlled to perform the second action B in the second interaction event when the first touch operation performed on the virtual action button is detected and the first touch operation ends in the second region.

Figure 12:
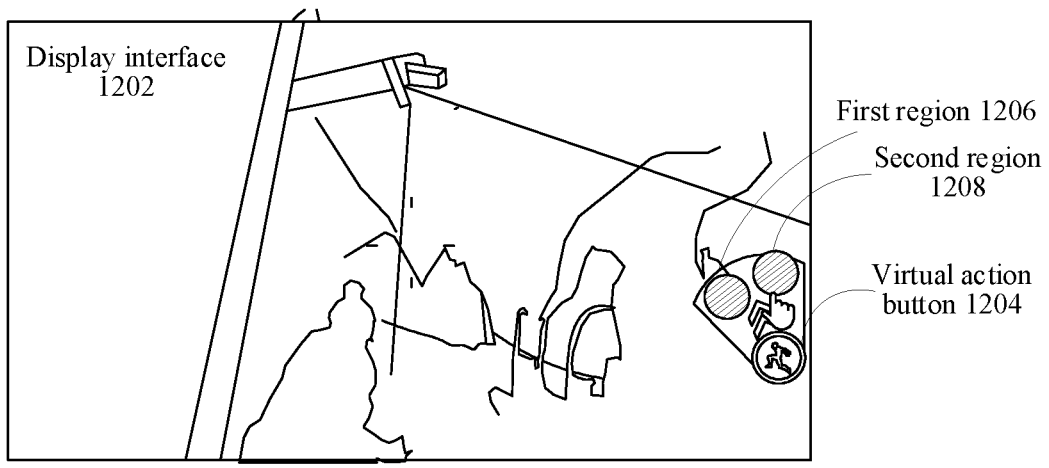
FIG. 12 is a schematic diagram of still another display interface according to an embodiment of this application.

In some embodiments, FIG. 12 is a schematic diagram of a display interface according to an embodiment of this application. As shown in FIG. 12, a virtual action button 1204 is displayed in a display interface 1202. When a slide operation performed on the virtual action button is detected, a first region 1206 and a second region 1208 are displayed in the display interface 1202, as shown in the shaded parts in FIG. 12. When the slide operation ends in the first region 1206, the target virtual character is controlled to perform the second action A; and when the slide operation ends in the second region 1208, the target virtual character is controlled to perform the second action B. The slide operation herein is both a first touch operation and a second touch operation. The foregoing description is merely an example, and is not specifically limited in this embodiment.

In some embodiments, the first interaction event is a zipline riding event, and the second action A includes a zipline riding action. The zipline riding action is used for enabling the target virtual object to jump and hold onto the virtual zipline, and slide along the virtual zipline; and the second interaction event is a climbing event, and the second action B includes a climbing action.

Through this embodiment, when the target virtual object is simultaneously within trigger ranges of a plurality of target interaction events and a second touch operation performed on the virtual action button is detected, target regions respectively corresponding to the plurality of target interaction events are displayed in the display interface, the target regions being used for triggering the target virtual object to perform the second action in the corresponding target interaction events. In this way, displaying of a plurality of virtual action buttons respectively corresponding to different target interaction events in the display interface is avoided. The technical solution of controlling the target virtual object to perform different actions based on the same virtual action button can be realized, and the technical problems of the complex manner of controlling a virtual object and relatively low control efficiency in the related art can be resolved. The technical effects of optimizing the user experience and improving the efficiency of controlling a virtual object to complete a plurality of interactive operations by the user are realized.

In some embodiments, after the controlling the target virtual object to perform a second action in the target interaction event, the method further includes: controlling the target virtual object to end the target interaction event when a third touch operation performed on the virtual action button is detected, the first touch operation and the third touch operation being the same or different.

In some embodiments, the third touch operation may include, but is not limited to, being set to be the same as the first touch operation. For example, when the first touch operation is configured as a click operation, the third touch operation may also be configured as a click operation. the third touch operation may further include, but is not limited to, being set to be different from the first touch operation. For example, when the first touch operation is configured as a press operation, the third touch operation may be configured as a release operation.

In other words, according to the actual situation, the target interaction event may be ended by acquiring the third touch operation and responding to the third touch operation.

In some embodiments, the controlling the target virtual object to end the target interaction event includes: controlling, when the target interaction event corresponds to an interactive prop, the target virtual object to end an interactive action on the interactive prop; or controlling, when the target interaction event corresponds to an interactive region, the target virtual object to end an interactive action on the interactive region; or controlling, when the target interaction event corresponds to an interactive virtual object, the target virtual object to end an interactive action on the interactive virtual object.

In some embodiments, the controlling, when the target interaction event corresponds to an interactive prop, the target virtual object to end an interactive action on the interactive prop includes: controlling, when the interactive prop corresponding to the target interaction event is a virtual zipline, the target virtual object to jump off the virtual zipline. That is, when the target interaction event is the zipline riding event, the target virtual object is controlled to jump off the virtual zipline.

In some embodiments, the controlling, when the target interaction event corresponds to an interactive region, the target virtual object to end an interactive action on the interactive region includes: controlling, when the interactive region corresponding to the target interaction event is a climbing region, the target virtual object to jump out of the climbing region. That is, when the target interaction event is the climbing event, the target virtual object is controlled to jump out of the climbing region. The foregoing description is merely an example, and is not specifically limited in this embodiment.

For ease of description, the foregoing method embodiments are stated as a combination of a series of actions. However, a person skilled in the art is to learn that this application is not limited to the described action sequence, because according to this application, some steps may be performed in another sequence or simultaneously. In addition, it is to be understood by a person skilled in the art that the embodiments described in the specification are all exemplary embodiments and the related actions and modules are not mandatory to this application.

This application is described below by using an example of a virtual game scene.

Figure 13:
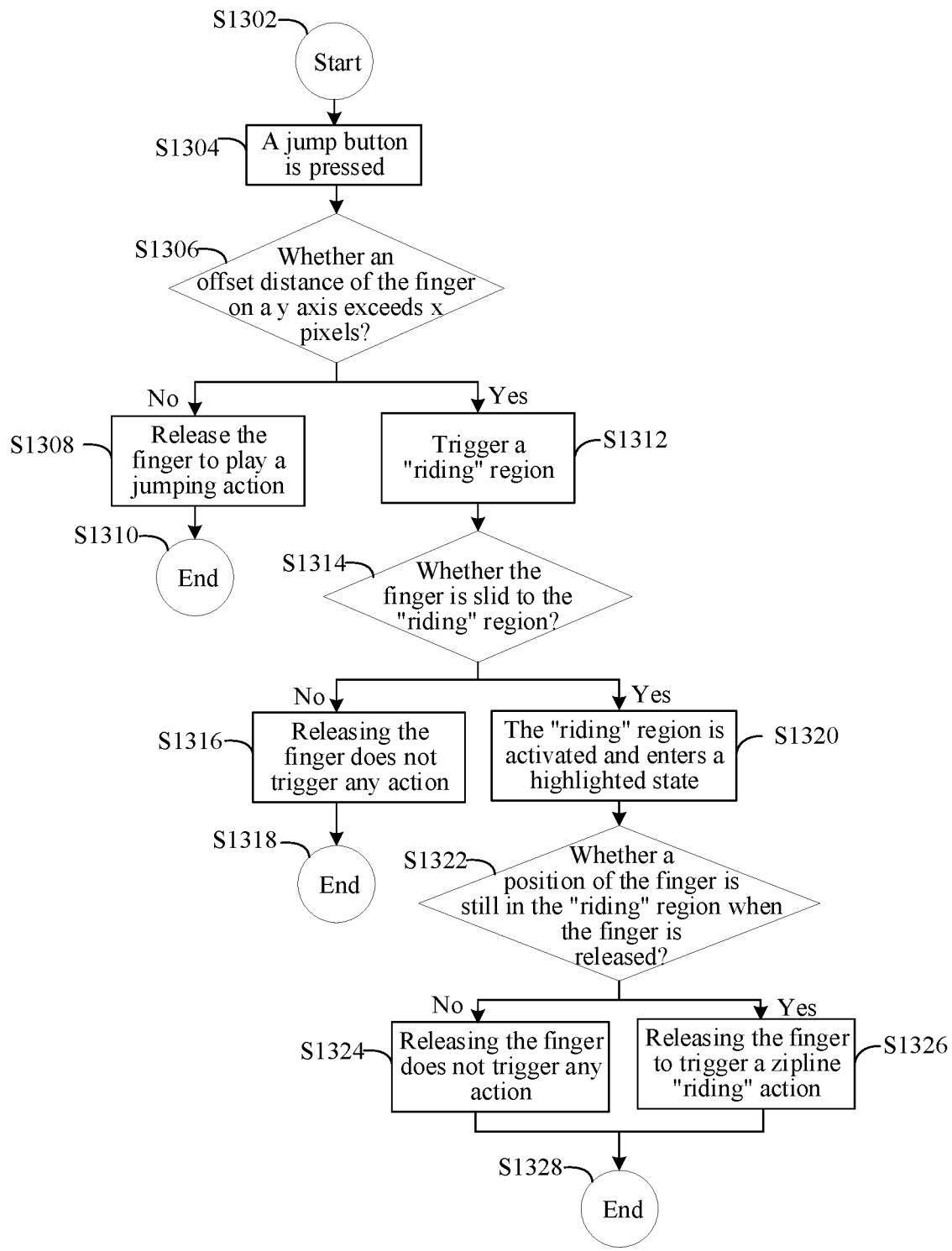
FIG. 13 is a schematic flowchart of another virtual object control method according to an embodiment of this application.

FIG. 13 is a schematic flowchart of another virtual object control method according to an embodiment of this application. As shown in FIG. 13, the process includes, but is not limited to, the following steps:

S1302: Start a game in a game application;

S1304: Detect that a jump button is pressed by a finger of a user (corresponding to the foregoing acquisition of the first touch operation on the virtual action button);

S1306: Determine whether an offset distance of the finger on a y axis exceeds x pixels;

S1308: Play, when the offset distance does not exceed x pixels, a jumping action (corresponding to the foregoing first action) when the release of the finger (the finger is released) is detected;

S1310: End the current process;

S1312: Trigger a "riding" region (corresponding to the foregoing target region) when the offset distance exceeds x pixels;

S1314: Determine whether the finger is slid to the "riding" region;

S1316: Trigger no action when the release of the finger is detected when the finger is not slid to the "riding" region;

S1318: End the current process;

S1320: When the finger is slid to the "riding" region, the "riding" region is activated and enters a highlighted state;

S1322: Determine whether a position of the finger is still in the "riding" region when the finger is released;

S1324: Trigger no action when the finger is released and the position at which the finger is released is not in the "riding" region;

S1326: Trigger a zipline "riding" action (corresponding to the foregoing second action) when the finger is released and the position at which the finger is released is in the "riding" region;

S1328: End the current process.

Through this embodiment, when the user presses the jump button, it is determined whether the finger is offset on the y axis. When the offset distance does not exceed a value x and the finger is released, it is determined as "clicking", and a jump behavior is triggered. When the offset distance exceeds a value x, it is determined as "sliding", and the "riding" region is triggered to be displayed. In this case, it is determined whether the finger is slid to the "riding" region. If not, releasing the finger does not trigger any action; and if yes, the "riding" region is activated and highlighted, prompting a player to release the finger for trigger. Finally, it is determined whether the finger is released in the "riding" region. If yes, the zipline "riding" action is triggered; and if not, no action is triggered. Therefore, in the game application, different interaction manners (clicking, sliding, and sliding in different directions) of the same virtual action button are used to implement a variety of operations, reducing the occlusion of a plurality of buttons on the interface, and making the field of view more focused, which resolves the technical problems of the complex manner of controlling a virtual object and relatively low control efficiency in the related art. The technical effects of optimizing the user experience and improving the efficiency of controlling a virtual object to complete a plurality of operations by the user are realized.

Figure 14:
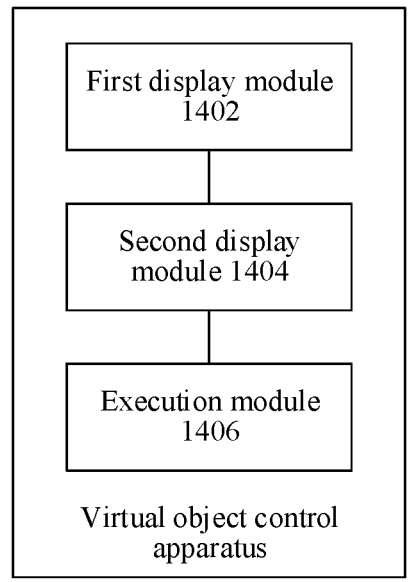
FIG. 14 is a schematic structural diagram of a virtual object control apparatus according to an embodiment of this application.

An embodiment of this application provides a virtual object control apparatus for implementing the foregoing virtual object control method. As shown in FIG. 14, the apparatus includes: a first display module 1402, configured to display a target virtual object and a virtual action button in a display interface, the virtual action button being configured to control the target virtual object to perform a first action; a second display module 1404, configured to display first prompt information in the display interface when the target virtual object is within a trigger range of a target interaction event, the first prompt information being used for prompting to perform a touch operation on the virtual action button; and an execution module 1406, configured to control the target virtual object to perform a second action in the target interaction event when a first touch operation performed on the virtual action button is detected.

In some embodiments, the execution module 1406 is further configured to control the target virtual object to perform the second action in the target interaction event when the first touch operation performed on the virtual action button is detected and the first touch operation ends in a target region.

In some embodiments, the second display module 1404 is further configured to display the target region in the display interface when a second touch operation performed on the virtual action button is detected, the first touch operation and the second touch operation being the same or different.

In some embodiments, the first touch operation is a slide operation, and the second touch operation is any one of the slide operation or a long-press operation, the long-press operation being an operation with a press duration greater than a duration threshold.

In some embodiments, the first touch operation is a slide operation; and the execution module 1406 is further configured to determine that the slide operation ends in the target region when it is detected that the virtual action button is pressed and the press point slides to the target region and then disappears; or determine that the slide operation ends in the target region when it is detected that the virtual action button is dragged to overlap the target region and then the dragging ends.

In some embodiments, the execution module 1406 is further configured to determine, when it is detected that the virtual action button is pressed and an offset distance of the press point in a target direction is greater than a distance threshold, that a slide operation performed on the virtual action button is detected, and use the slide operation as the first touch operation.

In some embodiments, the first prompt information includes direction prompt information, the direction prompt information being used for prompting a target direction of the touch operation performed on the virtual action button.

In some embodiments, the target interaction event corresponds to an interactive prop, and the second action is an interactive action on the interactive prop; or the target interaction event corresponds to an interactive region, and the second action is an interactive action on the interactive region; or the target interaction event corresponds to an interactive virtual object, and the second action is an interactive action on the interactive virtual object.

In some embodiments, the interactive prop corresponding to the target interaction event is a virtual zipline, and the second action is a zipline riding action on the virtual zipline, the zipline riding action being used for enabling the target virtual object to jump and hold onto the virtual zipline, and slide along the virtual zipline.

In some embodiments, the interactive region corresponding to the target interaction event is a climbing region, and the second action is a climbing action on the climbing region.

In some embodiments, the second display module 1404 is further configured to display, when the target virtual object is simultaneously within trigger ranges of a plurality of target interaction events and a second touch operation performed on the virtual action button is detected, target regions respectively corresponding to the plurality of target interaction events in the display interface, the target regions being used for triggering the target virtual object to perform the second action in the corresponding target interaction events, and the first touch operation and the second touch operation being the same or different.

In some embodiments, the execution module 1406 is further configured to control, when the first touch operation performed on the virtual action button is detected and the first touch operation ends in any target region, the target virtual object to perform the second action in a target interaction event corresponding to the any target region.

In some embodiments, the execution module 1406 is further configured to control the target virtual object to end the target interaction event when a third touch operation performed on the virtual action button is detected, the first touch operation and the third touch operation being the same or different.

In some embodiments, the execution module 1406 is further configured to control, when the target interaction event corresponds to an interactive prop, the target virtual object to end an interactive action on the interactive prop; or control, when the target interaction event corresponds to an interactive region, the target virtual object to end an interactive action on the interactive region; or control, when the target interaction event corresponds to an interactive virtual object, the target virtual object to end an interactive action on the interactive virtual object.

In some embodiments, when the interactive prop corresponding to the target interaction event is a virtual zipline, the target virtual object is controlled to jump off the virtual zipline; and when the interactive region corresponding to the target interaction event is a climbing region, the target virtual object is controlled to jump out of the climbing region.

Figure 15:
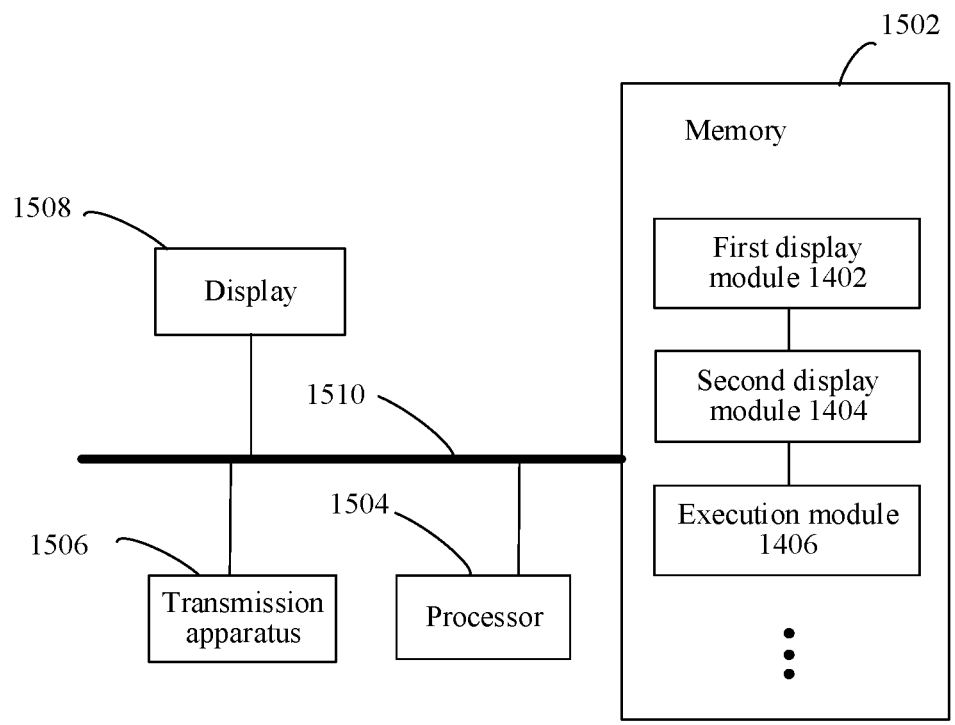
FIG. 15 is a schematic structural diagram of an electronic device according to an embodiment of this application.

An embodiment of this application provides an electronic device for implementing the foregoing virtual object control method. The electronic device may be the terminal device or the server shown in FIG. 1. In this embodiment, the electronic device being a terminal device is used as an example for description. As shown in FIG. 15, the electronic device includes a memory 1502 and a processor 1504. The memory 1502 stores a computer program. The processor 1504 is configured to perform the steps in the foregoing method embodiments through the computer program.

In some embodiments, the electronic device may be at least one of a plurality of network devices in a computer network.

In some embodiments, the processor may be configured to perform the following steps through the computer program: displaying a target virtual object and a virtual action button in a display interface, the virtual action button being configured to control the target virtual object to perform a first action; displaying first prompt information in the display interface when the target virtual object is within a trigger range of a target interaction event, the first prompt information being used for prompting to perform a touch operation on the virtual action button; and controlling the target virtual object to perform a second action in the target interaction event when a first touch operation performed on the virtual action button is detected.

In some embodiments, a person of ordinary skill in the art may understand that, the structure shown in FIG. 15 is only schematic. The electronic device may be a terminal device such as a smartphone (such as an Android mobile phone or an iOS mobile phone), a tablet computer, a palmtop computer, an MID, or a PAD. FIG. 15 does not limit the structure of the foregoing electronic device. For example, the electronic device may further include more or fewer components (such as a network interface) than those shown in FIG. 15, or have a configuration different from that shown in FIG. 15.

The memory 1502 may be configured to store a software program and a module, for example, a program instruction/module corresponding to the virtual object control method and apparatus in the embodiments of this application, and the processor 1504 performs various functional applications and data processing by running the software program and the module stored in the memory 1502, that is, implementing the foregoing virtual object control method. The memory 1502 may include a high-speed random memory, and may also include a non-volatile memory, for example, one or more magnetic storage apparatuses, a flash memory, or another non-volatile solid-state memory. In some examples, the memory 1502 may include memories remotely disposed relative to the processor 1504, and the remote memories may be connected to a terminal through a network. Examples of the network include, but are not limited to, the Internet, an intranet, a local area network, a mobile communication network and a combination thereof. The memory 1502 may be configured to, but is not limited to, store information such as virtual action button and a virtual object. In an example, as shown in FIG. 15, the memory 1502 may include, but is not limited to, the first display module 1402, the second display module 1404, and the execution module 1406 in the foregoing virtual object control apparatus. In addition, the memory may further include, but is not limited to, other modules and units in the virtual object control apparatus. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In some embodiments, a transmission apparatus 1506 is configured to receive or transmit data through a network. The network may include a wired network and a wireless network. In an example, the transmission apparatus 1506 includes a network interface controller (NIC). The NIC may be connected to another network device and a router by using a network cable, so as to communicate with the Internet or a local area network. In an example, the transmission apparatus 1506 is a radio frequency (RF) module, and is configured to communicate with the Internet in a wireless manner.

In addition, the foregoing electronic device further includes: a display 1508, configured to display a display interface (which, for example, may include a game screen and an interaction interface) of a virtual object control application (for example, a game application); a connection bus 1510, configured to connect various module components in the electronic device.

In other embodiments, the terminal device or server may be a node in a distributed system. The distributed system may be a blockchain system. The blockchain system may be a distributed system formed by the plurality of nodes connected in the form of network communication. The nodes may form a peer to peer (P2P) network. Electronic devices in any form, for example, electronic devices such as a server and a terminal, may become nodes in the blockchain system by joining the P2P network.

An embodiment of this application provides a computer program product or a computer program. The computer program product or the computer program includes computer instructions (executable instructions), and the computer instructions are stored in a computer-readable storage medium. A processor of an electronic device reads the computer instructions from the computer-readable storage medium, and executes the computer instructions, so that the electronic device performs the virtual object control method provided in the implementations of the foregoing virtual object control aspects. The computer program is configured to perform the steps in the foregoing method embodiments when running.

In some embodiments, the computer-readable storage medium may be configured to store a computer program configured to perform the following steps: displaying a target virtual object and a virtual action button in a display interface, the virtual action button being configured to control the target virtual object to perform a first action; displaying first prompt information in the display interface when the target virtual object is within a trigger range of a target interaction event, the first prompt information being used for prompting to perform a touch operation on the virtual action button; and controlling the target virtual object to perform a second action in the target interaction event when a first touch operation performed on the virtual action button is detected.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for description purposes, and are not intended to indicate the preference among the embodiments.

In a case that the integrated unit in the foregoing embodiments is implemented in the form of a software function unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more electronic devices (which may be a PC, a server, a network device, or the like) to perform all or some of steps of the methods in the embodiments of this application.

In the foregoing embodiments of this application, descriptions of the embodiments have different emphases. As for parts that are not described in detail in one embodiment, reference may be made to the relevant descriptions of the other embodiments.

In the several embodiments provided in this application, it is to be understood that the disclosed client may be implemented in other manners. The described apparatus embodiments are merely exemplary. For example, the unit division is merely logical function division, and may use other division manners during actual implementation. For example, a plurality of units or components may be combined or integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A virtual object control method performed by an electronic device, the method comprising:
    displaying a target virtual object and a virtual action button in a display interface, the virtual action button being configured to control the target virtual object to perform a first action;
    detecting a target interaction event based a current location of the target virtual object;
    in accordance with a determination that the target virtual object is within a trigger range of the target interaction event, displaying first prompt information in a surrounding region of the virtual action button, the first prompt information being used for prompting to perform a touch operation on the virtual action button;
    adding an action indicator to the first prompt information when a first touch operation satisfying a predefined threshold condition associated with a second action is initiated on the virtual action button, the action indicator indicating that the second action different from the first action is to be performed; and
    controlling the target virtual object to perform the second action in the target interaction event when the first touch operation satisfying the predefined threshold condition associated with the second action is completed on the virtual action button in accordance with the action indicator.

2. The method according to claim 1, wherein the controlling the target virtual object to perform the second action in the target interaction event when the first touch operation satisfying the predefined threshold condition associated with the second action is completed on the virtual action button comprises:
    controlling the target virtual object to perform the second action in the target interaction event when the first touch operation performed on the virtual action button ends in a target region.

3. The method according to claim 2, further comprising:
displaying the target region in the display interface when a second touch operation performed on the virtual action button is detected.

4. The method according to claim 3, wherein the first touch operation is a slide operation, and the second touch operation is any one of the slide operation or a long-press operation, the long-press operation being an operation with a press duration greater than a duration threshold.

5. The method according to claim 2, wherein the first touch operation is a slide operation; and the method further comprises:
determining that the slide operation ends in the target region when it is detected that the virtual action button is pressed and the press point slides to the target region and then disappears; or
determining that the slide operation ends in the target region when it is detected that the virtual action button is dragged to overlap the target region and then the dragging ends.

6. The method according to claim 2, further comprising:
displaying second prompt information in the display interface when an execution object of the first touch operation is updated from the virtual action button to the target region, the second prompt information being used for prompting to end the first touch operation in the target region.

7. The method according to claim 6, wherein the displaying second prompt information in the display interface comprises:
performing at least one of the following processing in the display interface:
updating a display state of the target region;
displaying at least one of a text identifier or an animation effect; and
updating identification information of the virtual action button.

8. The method according to claim 1, further comprising:
determining, when it is detected that the virtual action button is pressed and an offset distance of the press point in a target direction is greater than a distance threshold, that a slide operation performed on the virtual action button is as the first touch operation.

9. The method according to claim 1, wherein the first prompt information comprises direction prompt information, the direction prompt information being used for prompting a target direction of the touch operation performed on the virtual action button.

10. The method according to claim 1, wherein the target interaction event corresponds to an interactive prop, and the second action is an interactive action on the interactive prop; or
the target interaction event corresponds to an interactive region, and the second action is an interactive action on the interactive region; or
the target interaction event corresponds to an interactive virtual object, and the second action is an interactive action on the interactive virtual object.

11. The method according to claim 10, wherein the interactive prop corresponding to the target interaction event is a virtual zipline, and the second action is a zipline riding action on the virtual zipline, the zipline riding action being used for enabling the target virtual object to jump and hold onto the virtual zipline, and slide along the virtual zipline.

12. The method according to claim 10, wherein the interactive region corresponding to the target interaction event is a climbing region, and the second action is a climbing action on the climbing region.

13. The method according to claim 1, further comprising:
displaying, when the target virtual object is simultaneously within trigger ranges of a plurality of target interaction events and a second touch operation performed within the surrounding region of the virtual action button is detected, target regions respectively corresponding to the plurality of target interaction events in the display interface, the target regions being used for triggering the target virtual object to perform the second action in the corresponding target interaction events.

14. The method according to claim 13, wherein the controlling the target virtual object to perform the second action in the target interaction event when the first touch operation satisfying the predefined threshold condition associated with the second action is completed on the virtual action button comprises:
controlling, when the first touch operation performed on the virtual action button ends in any of the target regions, the target virtual object to perform the second action in a target interaction event corresponding to the target region.

15. The method according to claim 1, further comprising:
controlling the target virtual object to end the target interaction event when a third touch operation performed on the virtual action button is detected.

16. The method according to claim 15, wherein the controlling the target virtual object to end the target interaction event comprises:
controlling, when the target interaction event corresponds to an interactive prop, the target virtual object to end an interactive action on the interactive prop; or
controlling, when the target interaction event corresponds to an interactive region, the target virtual object to end an interactive action on the interactive region; or
controlling, when the target interaction event corresponds to an interactive virtual object, the target virtual object to end an interactive action on the interactive virtual object.

17. The method according to claim 16, wherein the controlling, when the target interaction event corresponds to an interactive prop, the target virtual object to end an interactive action on the interactive prop comprises:
controlling, when the interactive prop corresponding to the target interaction event is a virtual zipline, the target virtual object to jump off the virtual zipline; and
the controlling, when the target interaction event corresponds to an interactive region, the target virtual object to end an interactive action on the interactive region comprises:
controlling, when the interactive region corresponding to the target interaction event is a climbing region, the target virtual object to jump out of the climbing region.

18. The method according to claim 1, wherein the first prompt information comprises at least one of a drag direction mark or a press strength mark,
the drag direction mark being used for prompting to perform a drag operation on the virtual action button, and the press strength mark being used for prompting to perform a press operation on the virtual action button.

19. An electronic device, comprising a memory and a processor, the memory storing computer instructions, and the processor, through executing the computer instructions, being configured to implement a virtual object control method by:
- displaying a target virtual object and a virtual action button in a display interface, the virtual action button being configured to control the target virtual object to perform a first action;
- detecting a target interaction event based a current location of the target virtual object;
- in accordance with a determination that the target virtual object is within a trigger range of the target interaction event, displaying first prompt information in a surrounding region of the virtual action button, the first prompt information being used for prompting to perform a touch operation on the virtual action button;
- adding an action indicator to the first prompt information when a first touch operation satisfying a predefined threshold condition associated with a second action is initiated on the virtual action button, the action indicator indicating that the second action different from the first action is to be performed; and
- controlling the target virtual object to perform the second action in the target interaction event when the first touch operation satisfying the predefined threshold condition associated with the second action is completed on the virtual action button in accordance with the action indicator.

20. A non-transitory computer-readable storage medium, storing computer instructions, the computer instructions, when executed by a processor of an electronic device, implementing a virtual object control method by:
- displaying a target virtual object and a virtual action button in a display interface, the virtual action button being configured to control the target virtual object to perform a first action;
- detecting a target interaction event based a current location of the target virtual object;
- in accordance with a determination that the target virtual object is within a trigger range of the target interaction event, displaying first prompt information in a surrounding region of the virtual action button, the first prompt information being used for prompting to perform a touch operation on the virtual action button;
- adding an action indicator to the first prompt information when a first touch operation satisfying a predefined threshold condition associated with a second action is initiated on the virtual action button, the action indicator indicating that the second action different from the first action is to be performed; and
- controlling the target virtual object to perform the second action in the target interaction event when the first touch operation satisfying the predefined threshold condition associated with the second action is completed on the virtual action button in accordance with the action indicator.

\* \* \* \* \*